(12) United States Patent
Yamamoto et al.

(10) Patent No.: US 6,517,061 B2
(45) Date of Patent: Feb. 11, 2003

(54) VIBRATION ISOLATING DEVICE

(75) Inventors: Kentaro Yamamoto, Osaka (JP);
Hikofumi Yamamoto, Osaka (JP);
Yukio Takashima, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 10/075,685

(22) Filed: Feb. 14, 2002

(65) Prior Publication Data
US 2002/0195758 A1 Dec. 26, 2002

(30) Foreign Application Priority Data
Jun. 21, 2001 (WO) .............................. PCT/JP01/05335

(51) Int. Cl.[7] ................................................ F16M 9/00
(52) U.S. Cl. .............................. 267/140.11; 267/140.3; 267/140.5
(58) Field of Search ................ 267/140.11, 140.12, 267/140.13, 140.3, 140.5, 136, 141, 219, 292

(56) References Cited
U.S. PATENT DOCUMENTS 5,009,402 A * 4/1991 Sato ............................ 267/219
5,630,573 A * 5/1997 Suzuki et al. .......... 267/140.13
5,743,509 A * 4/1998 Kanda et al. ................ 248/635
5,775,666 A    7/1998 Tsukamoto et al.
6,435,489 B1 * 8/2002 Rice et al. ................ 267/140.5

FOREIGN PATENT DOCUMENTS

| JP | 8-210423 | 8/1996 |
|---|---|---|
| JP | 9-89037 | 3/1997 |
| JP | 10-9330 | 1/1998 |
| JP | 10-213174 | 8/1998 |
| JP | 2000-297837 | 10/2000 |
| WO | WO89/11416 | 11/1989 |

\* cited by examiner

Primary Examiner—Christopher P. Schwartz
Assistant Examiner—Melanie Torres
(74) Attorney, Agent, or Firm—Jordan and Hamburg LLP

(57) ABSTRACT

A vibration isolating device includes a body fitting having a cylindrical barrel, an upper side attached fitting disposed upward an axis center of the body fitting, a rudder isolating substrate to connect both fittings, a stopper fitting fixed at an opening extremities of the body fitting and extending upwardly outside the vibration isolating substrate, its upper end portion being folded inside as a stopper portion, so that the stopper fitting acts as a stopper for large displacement of the upper side attachment fitting caused by vibration, a notch window for drainage and ventilation being formed at at least two opposite places at the lower portion of the stopper fitting, and a protrusion for circumferential positioning fitting-in and engaging with the notch windows provided at the opening extremities of the body fitting.

7 Claims, 5 Drawing Sheets

VIBRATION ISOLATING DEVICE

FIELD OF THE INVENTION

This invention mainly relates to a vibration-isolating device used to support a vibration generating source such as vehicle engine for the purpose of vibration isolation.

DESCRIPTION OF THE RELATED ART

A liquid-in vibration isolator has been known as a mount supporting a vibration generating source such as vehicle engine so as not to transmit its vibration to a vehicle body (for example, JP-A-9-89037, JP-A-10-9330).

The vibration isolator of such type is configured so that a cylindrical body fitting attached and fixed to the support side such as vehicle body frame and an upper side attachment fitting attached to the side of the vibration generator such as engine are connected via a thick vibration isolating substrate made of a rubber material with external contour in the form of nearly truncated cone, a diaphragm is further disposed at the lower side of the body fitting opposite to the vibration isolating substrate, there are liquid-in chambers between the vibration isolating substrate and the diaphragm, the liquid-in chambers are divided into two liquid chambers on the side of the vibration isolating substrate and the diaphragm by means of a partition member, both liquid chambers are passed through by an orifice, the vibration damping and vibration isolating functions are fulfilled by the liquid flowing effect between both liquid chambers produced by the orifice and the vibration suppressing effect of the vibration isolating substrate.

The vibration isolator of this kind provides a stopper mechanism to restrain the displacement of more than the predetermined level of the upper side attachment fitting when the vibration isolating substrate is deformed due to vibration of engine and the like and the upper side attachment fitting moves in the up-and-down direction and the fore-and-aft and lateral direction square to the axial direction.

The stopper mechanism is constructed so that a stopper flange projecting radially is provided for the upper side attachment fitting, a cylindrical stopper fitting extending outwardly of the vibration isolating substrate above the flange is fixed to the cylindrical body fitting, the upper end of the stopper fitting is inwardly folded and formed to be located above the flange, for acting stopper function.

With the use of this stopper mechanism, in time of large displacement in the upward direction or square to the axial direction (fore-and-aft or lateral direction) accompanied by vibration, the stopper flange abuts the folded extremities or the side walls in the form of an inner flange of the stopper fitting to restrain movement of the upper side attachment fitting more than a certain level, and the upper side attachment fitting is difficult to be released (falling off) when a vehicle comes into collision, etc. Thus, the stopper mechanism brings about high reliability in strength.

However, in the case of the vibration isolator of the aforementioned structure, since entire circumference of the vibration isolating substrate portion is covered with the stopper fitting, the inside of the stopper fitting is liable to be filled with radiant heat of an engine and the like so that the ambient temperature of the portion becomes higher than that of outside, whereby there is a possibility that vibration isolating substrate made up of a rubber material is cracked or torn earlier, with the result that durability is deteriorated.

Further, if rainwater and the like penetrates from an opening at the upper portion of the stopper fitting, the water remains there without draining away. The water becomes rotten and is liable to cause corrosion or rust, thus there is the possibility of making the vibration isolating substrate change in quality or deteriorate.

As a means of settling these problems, it has been considered to form a notch window for drainage and ventilation on the side wall of the stopper fitting so far (for example, JP-A-8-210423). In this case, when there is only one notch window, ventilating effect cannot be obtained sufficiently, and drainage effect of penetrated rainwater and the like is not sufficient. Therefore, it is preferable that the notch window shall be formed at two opposite places.

Incidentally, the stopper fitting is caulked and secured at the lower extremities thereof as against the opening extremities of the body fitting, as roughly cylindrical shape with the notch window portion cut out. As for this caulking and securing, although the opening extremities of the body fitting are in the form of a flange of the same diameter over entire circumference, unless the opening extremities are provided with circumferentially positioning means, it is not easy to perform positioning at the time of caulking and securing, and the direction of stopper fitting against the body fitting is liable to get out of position.

For example, if the direction of the notch window of the stopper fitting must be aligned to a definite direction of fore-and-aft of the vehicle and the like with respect to the body fitting attached to the support side of the vehicle frame, etc., it is difficult to perform positioning at the time of caulking and securing, special jigs and the like are required for the positioning, and it is also highly feared that the state of fixing gets out of position.

In the state of use of the vibration isolating device, the stopper fitting abuts to the member such as bracket on a vibration generating source of the stopper fitting. However, if any load from such abutment is applied to the stopper fitting locally and repeatedly, there is a possibility that the stopper fitting gets out of position circumferentially or parts from the body fitting. In particular, since the caulked and secured portion is separated into two opposite portions when the notch window is formed at two opposite places, it is considered that such getting out-of-position and the like are liable to be occurred.

Therefore, when any notch windows are provided on the stopper fitting of the vibration isolating device, it is desired that the stopper fitting can be positioned easily and securely in regard to the opening extremities of the body fitting and that getting out-of-position and the like due to loading by stopper action can also be restrained. The present invention has an object to settle such problems.

Disclosure of the Invention

The vibration isolating device of the present invention comprises a body fitting having a cylindrical barrel, an upper side attachment fitting disposed upward an axis center of the body fitting, a vibration isolating substrate made of a rubber material to connect both fittings, a stopper fitting fixed at an opening extremities of the body fitting and extending upwardly outside the vibration isolating substrate, its upper end portion being folded inside as a stopper portion, so that the stopper fitting acts stopper function for large displacement of the upper side attachment fitting consequent upon vibration, a notch window for drainage and ventilation being formed at least two opposite places at the lower portion of the stopper fitting, and a protrusion for circumferential positioning fitting-in and engaging with the notch windows provided at the opening extremities of the body fitting.

According to the vibration isolating device, when the stopper fitting is fixed to the opening extremities of the body fitting by, for example, a caulking fastening means, the stopper fitting can easily be positioned by fitting the notch windows at the lower portion of the stopper fitting into the protrusion for positioning on the opening extremities of the body fitting, and also restrain from circumferential movement. Thereby, the stopper fitting is accurately positioned and secured so that the notch windows thereof are in a definite direction to the body fitting.

Furthermore, in the state of use, even when the stopper fitting is loaded locally and repeatedly by the loading due to stopper action at the time of bounding, since the protrusions are fitted into and engaged with at least two opposite notch windows, it is not apprehended that the stopper fitting circumferentially gets out of position or parts from the body fitting. Therefore, proper and adequate draining and ventilating effects through at least two opposite notch windows can increase its durability.

As a securing means of the stopper fitting, normally, the opening extremities of the body fitting may be formed in the form of a flange, and the lower extremities of the stopper fitting be caulked and secured to the flanged opening extremities. Thereby, the stopper fitting can easily and accurately be positioned, and also easily be caulked and secured.

The protrusions for positioning can be produced easily by radially projecting from the edges of the flanged opening extremities. Furthermore, by making the protrusions engage with circumferential both side edges of the notch windows, the stopper fitting can be positioned circumferentially and prevented securely from getting out of position.

Furthermore, as for the vibration isolating device, it is preferable that the notch windows has an opening width in a range of angle from 50 to 70° as viewed from an axial center of the device, and that the protrusions are formed at least both side extremities in a range corresponding to the notch windows. Thereby, draining and ventilating functions can be performed properly through the notch windows, and the stopper fitting can be positioned and also prevented from getting out of position properly.

As for the vibration isolating device, the upper side attachment fitting has a stopper flange projecting outwardly upwards the vibration isolating substrate, the stopper portion of the stopper fitting is interposed between the flange and the vibration generator fitted and secured above the flange so as to perform stopper action against vertical large displacement of the upper side attachment fitting. This allows proper stopper action.

With regard to the vibration isolating device, it is desirable, from the viewpoint of vibration damping function and vibration isolating function, that a diaphragm made of a rubber film is disposed opposite to the vibration isolating substrate at the lower side of the body fitting, that there is a liquid-in chamber between the vibration isolating substrate and the diaphragm, that the liquid-in chamber is divided into two liquid chambers at the vibration isolating substrate and the diaphragm by means of a partition member, and that both liquid chambers are connected by an orifice.

BEST MODE FOR CARRYING OUT THE INVENTION

Figure 1:
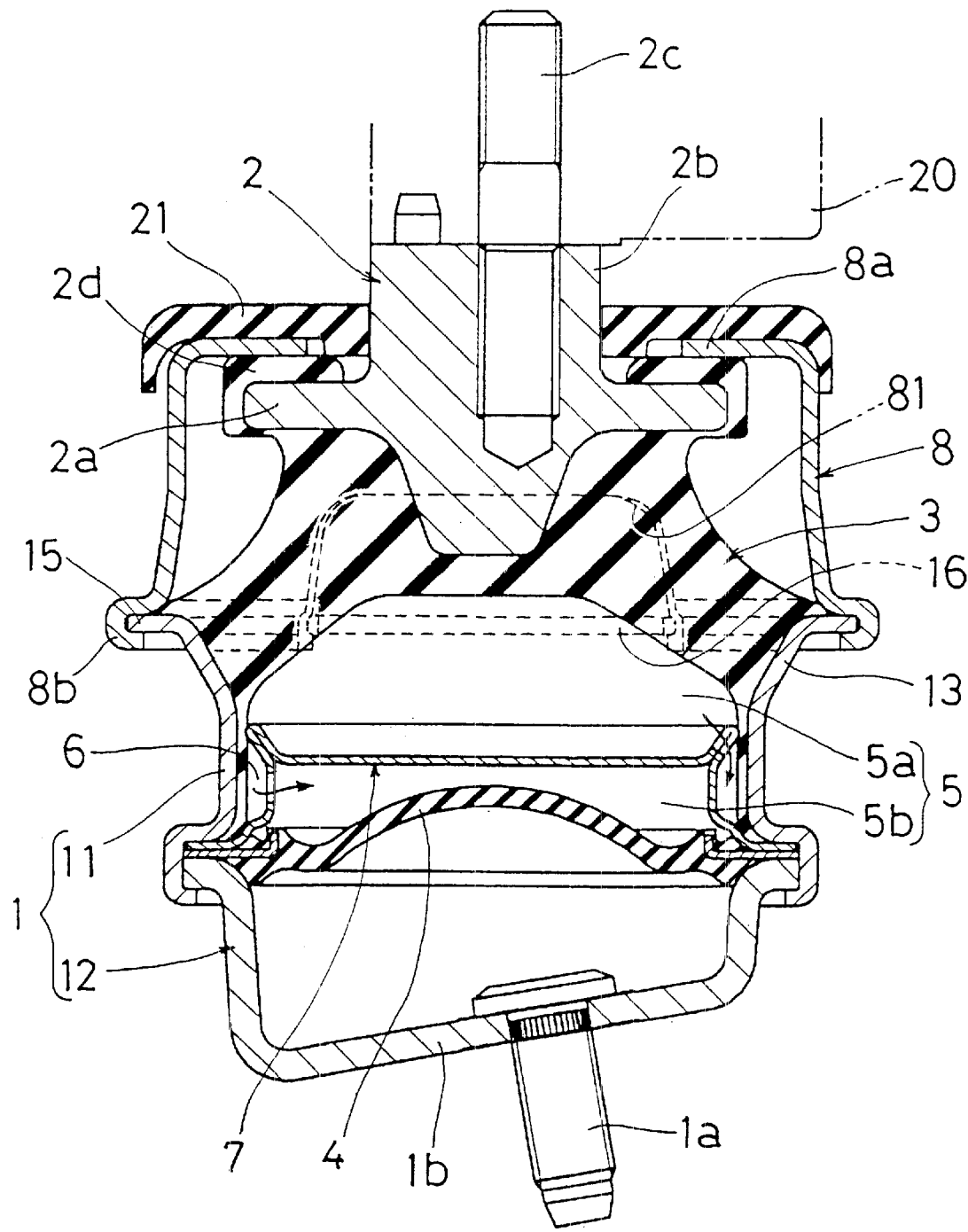
FIG. 1 is a longitudinal sectional view showing one embodiment of a vibration isolating device of the present invention.
Figure 2:
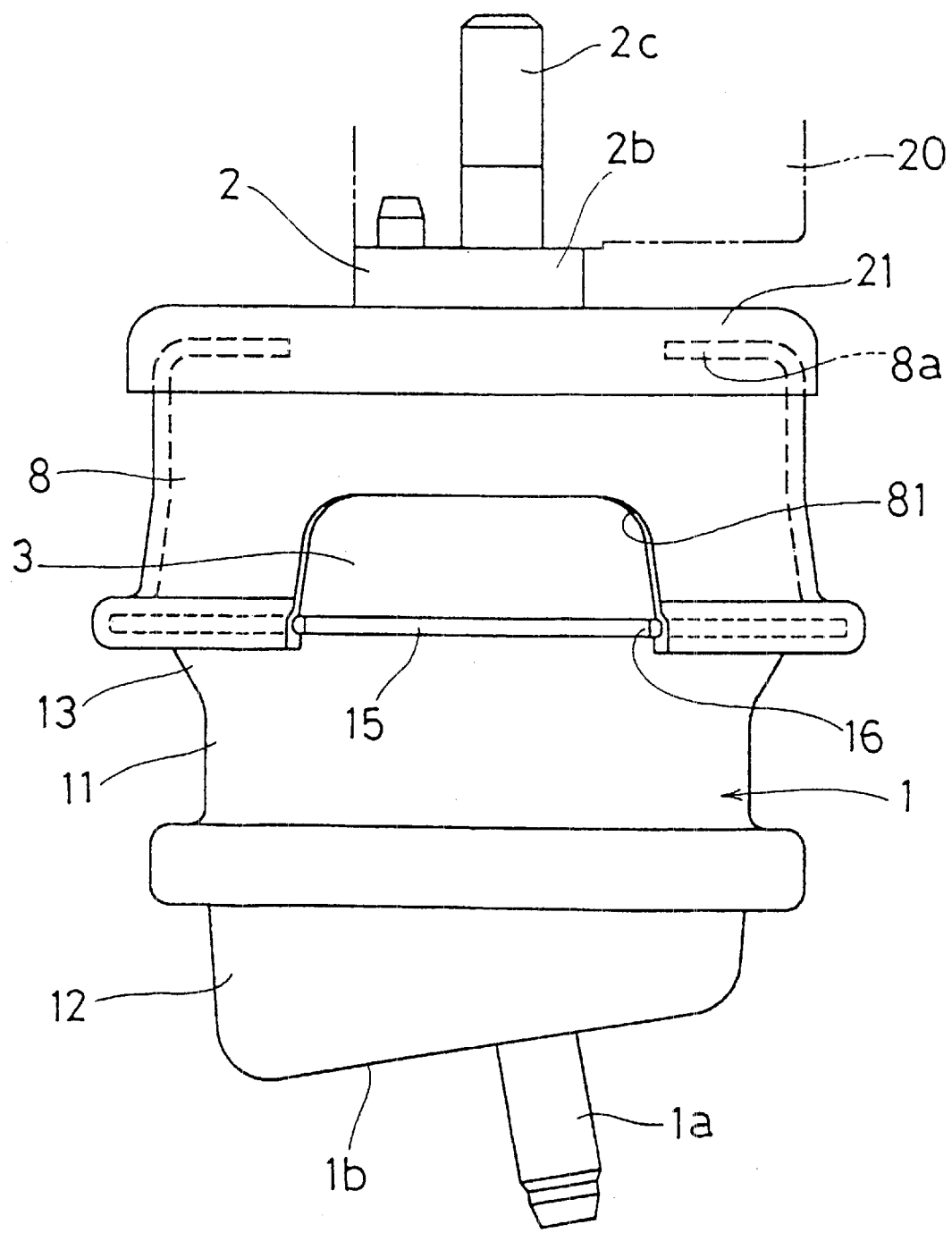
FIG. 2 is an elevational view of the vibration isolating device of FIG. 1.
Figure 3:
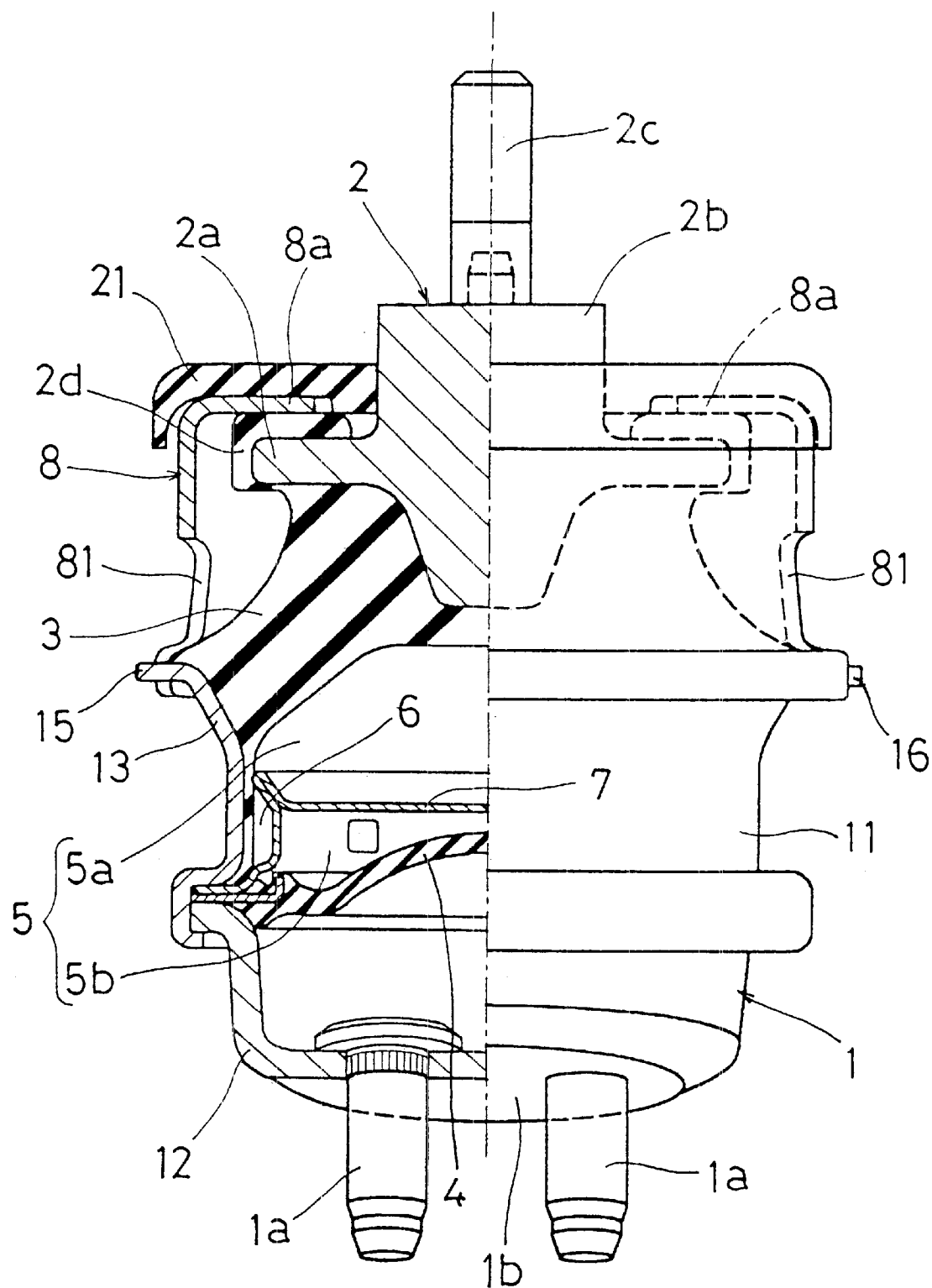
FIG. 3 is a half longitudinal sectional view of the vibration isolating device of FIG. 2.

The embodiments of the present invention will be described with reference to the accompanying drawings, but the invention is not limited thereto.

In the drawings, the reference numeral 1 indicates a body fitting having a cylindrical barrel 11, and at the bottom of the body fitting 1 an attachment bolt 1a is projectively provided. In the drawings, a bottom member 12 is fastened and configured at the lower extremities of the cylindrical barrel 11 by a caulking and securing means, as an attachment fitting. The cylindrical barrel 11 and the bottom member 12 may be formed in one piece. A bottom portion 1b of the body fitting 1 having the bottom member 12 is inclined in the predetermined direction against a plane square to an axial center of the device, so that the body fitting 1 can be inclined in the predetermined direction, for example, in the lateral direction of a vehicle, against a support member such as vehicle frame and fixed there.

The reference number 2 indicates an upper side attachment fitting disposed at a given intervals at the upper portion of the axis center of the body fitting 1. At a part of the upper side attachment fitting 2, for example, at the intermediate portion a flange 2a for a stopper extending radially outwardly is formed in one piece, and an attachment bolt 2c is projectively fitted at the upper axial portion 2b by means of screw-in and press-fitting or welding means, so as to be able to fix a member 20 such as mounting bracket on the side of the vibration generator. A stopper rubber 2d is fitted by the vulcanization adhering means from the top surface to the outer circumference on the flange 2a, and elastically abuts on a stopper fitting described later.

The numeral 3 indicates a vibration isolating substrate made of a rubber material with external contour in the form of nearly truncated cone, and a portion below the flange 2a of the upper side attachment fitting 2 is embedded and fixed by the vulcanization adhering means. The lower end outer circumference of the vibration isolating substrate 3 is stuck to the upper extremities 1a of the body fitting 1 by means of vulcanization adhering means. In the drawings, the upper extremities 13 of the body fitting 1 is upset in the form of a taper, and the lower portion of the outer circumference of the vibration isolating substrate 3 is vulcanization adhered to the upper extremities 13. Besides, with a reinforcing fitting (not shown) vulcanization adhered at the lower end of the outer circumference of the vibration isolating substrate 3, the reinforcing fitting can also be press-fitted and fixed at the upper extremities of the body fitting 1.

The body fitting 1 and the upper side attachment fitting 2 are connected via the vibration isolating substrate 3 described above. Normally, the upper side attachment fitting 2 is fastened on the side of vibration generator such as engine, and the body fitting 1 is fixed on the support side such as vehicle frame before making use.

Furthermore, a diaphragm 4 made of a rubber film opposite to the vibration isolating substrate 3 is disposed on the lower side of the body fitting 1, and inner chambers between the diaphragm 4 and the vibration isolating substrate 3 are formed as liquid-in chambers 5. At the inner circumference of the body fitting 1 in the liquid-in chamber 5 a partition member 7 having an orifice 6 at the outer circumference is fitted liquid-tightly, and the liquid-in chamber 5 is divided into a liquid chamber 5a on the side of the vibration isolating substrate 3 and a liquid chamber 5b on the side of the diaphragm 4 by means of the partition member 7. Both liquid chambers 5a, 5b are connected through the orifice 6, and the vibration damping and vibration isolating functions are performed by means of the liquid flowing effect between both liquid chambers 5a, 5b and the vibration suppressing effect of the vibration isolating substrate 3.

The outer circumferential extremities of the diaphragm 4 and the partition member 7 are fixed integrally by caulking and securing the bottom member 12 covering the lower portion thereof and the, cylindrical barrel 11.

Besides, at opening extremities 15 of the body fitting 1, that is, at the opening extremities 15 in the form of a flange folded and extended radially from the upper extremities, a roughly cylindrical stopper fitting 8 extending outwardly the vibration isolating substrate 3 to the upper position above the flange 2a is caulked and secured. The stopper fitting 8, the upper extremity of which is folded inside as a stopper portion 8a to be in the form of an inner flange, is interposed between the flange 2a of the upper side attachment fitting 2 and, upward thereof, the member 20 on the side of the vibration generator to be fixed to the upper side attachment fitting 2. The reference numeral 21 is a rubber cover attached to the axial portion 2b of the upper side attachment fitting 2 above the stopper portion 8a to prevent rainwater, etc. from coming through the upper opening of the stopper fitting 8 and also to play the role of shock absorption when the stopper fitting 8 abuts against the member 20.

Accordingly, when the upper side attachment fitting 2 moves upward largely consequent upon vibration, the flange 2a abuts via the stopper rubber 2d against the stopper 8a in the form of an inner flange at the upper extremities of the stopper fitting 8, whereas, at the time of downward large displacement, the member 20 abuts through the rubber cover 21 against the stopper portion 8a, thus playing the role of stopper function. Besides, at the time of large displacement in the direction square to the axial direction (fore-and-aft, lateral), the outer circumference of the flange 2a abuts against the side wall portion of the stopper fitting 8, placing the role of stopper action.

As shown in the drawings, notch windows 81, 81 for drainage and ventilation are provided by making a notch at two opposite radial places continuously from the lower end on the lower side of the stopper fitting 8. For that purpose, the stopper fitting 8 is caulked at a lower extremity 8b except the notch windows 81, 81 and secured to the opening extremities 15 of the body fitting 1.

Further, a protrusion 16 for circumferential positioning which is fitted into and engages with the notch windows 81, 81, is radially projected from an edge of the opening extremities 15, whereby the stopper fitting 8 is positioned with respect to the body fitting 1 so that the notch windows 81, 81 can be faced toward a definite direction before being caulked and secured. Accordingly, the notch windows 81 can be faced toward the predetermined direction by appropriately setting the position of the protrusion 16 for positioning.

Figure 4:
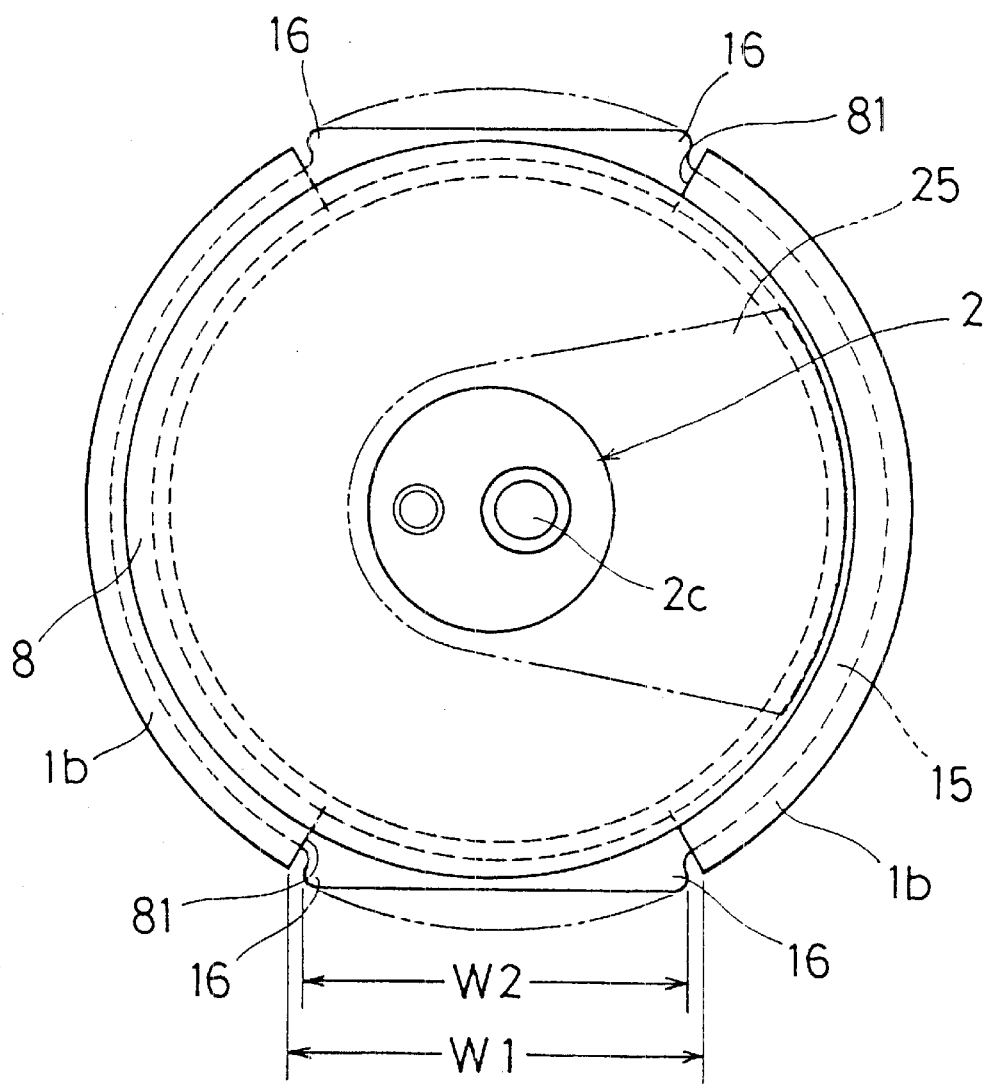
FIG. 4 is a plan view of the vibration isolating device of FIG. 3.

As the protrusion 16 for positioning, in order to engage with circumferential both side edges of the notch windows 81, entire outer edge of a portion roughly corresponding to the circumferential opening width W1 of the notch windows 81 can also be formed radially projectively from the opening extremities 15 in the form of a flange as indicated by a chain line in FIG. 4. However, it is desirable in the embodiment to provide the protrusions 16, 16, which engage with both side edges of the notch windows 81, at both side extremities, by excising tangentially the outer edge of a portion roughly corresponding to the notch windows 81 as shown in FIG. 4, because of suppressing extra protrusion and weight increase.

In either cases, circumferential width W2 for the positioning protrusions 16, 16 is roughly equal to the opening width W1 of the notch windows 81 or slightly smaller width, so as to easily perform fitting-in and engaging operations for positioning.

A projective form of protrusion 16 for positioning may be of any shape if it can engage with the notch window 81 of the stopper fitting 8 to perform positioning function.

Further, on being formed at opposite two places as shown in the drawings, the notch windows 81 of the stopper fitting 8 have preferably the opening width in a range of angle from 50 to 70°, preferably 60° or thereabout as viewed from an axial center of the device, in that draining and ventilating effects are favorably kept and also the strength of caulked and secured portion is retained by the lower extremities 8b. Furthermore, the notch windows 81 can also be provided at three or more places circumferentially at intervals in the embodiment. In this case, however, the opening width is set narrower than the aforementioned width and a given strength can be retained at the caulked and secured portion by the lower extremities excluding the notch windows. In these cases, similar to the aforementioned embodiments, the positioning protrusion fitting-in and engaging with the notch windows is also provided at the opening extremities of the body fitting.

Figure 5:
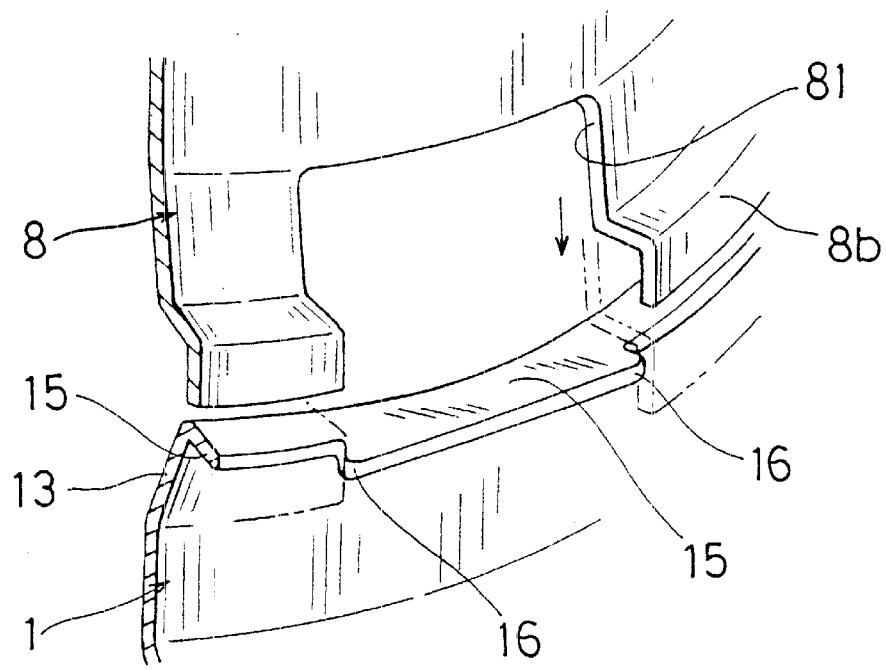
FIG. 5 is a fragmentary enlarged perspective view before caulking and securing a stopper fitting to an opening extremities of a body fitting.
Figure 6:
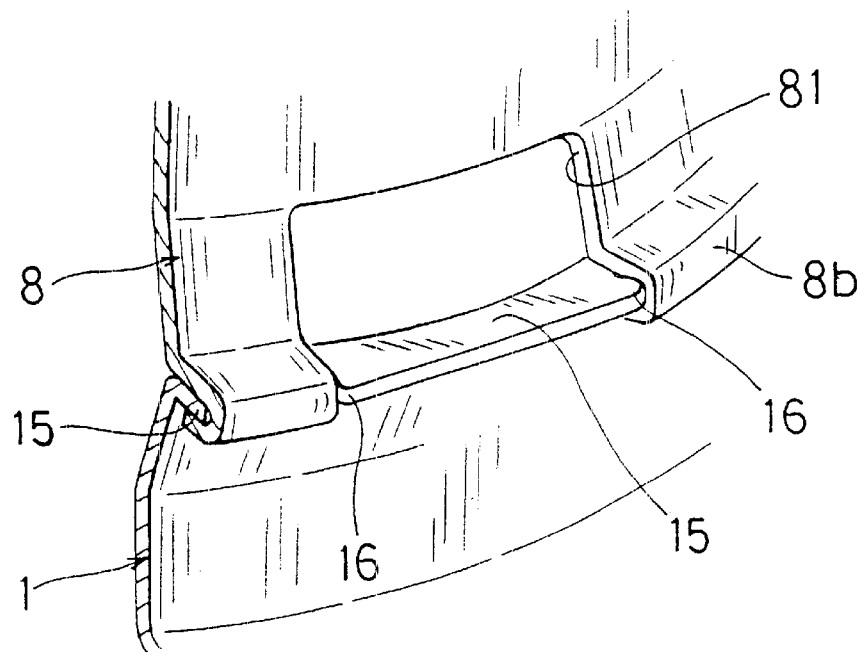
FIG. 6 is a fragmentary enlarged perspective view showing the caulking and securing state of the stopper fitting in FIG. 5.

According to the vibration isolating device in the embodiments described above, when the lower extremities 8b of the stopper fitting 8 is caulked and secured to the opening extremities 15 of the body fitting 1 during assembling operations of the vibrating isolating device, the stopper fitting 8 can easily be positioned by fitting the notch windows 81 of the stopper fitting 8 into the protrusion 16 for positioning on the opening extremities 15 as indicated by a chain line in FIG. 5, thus the lower extremities 8b upset and formed at the ends of the stopper fitting 8 are fitted into the opening extremities 15 of the body fitting 1 and then caulked and secured as shown in FIG. 6. The stopper fitting 8 can be restrained from moving circumferentially by means of the caulking and securing working, allowing the notch windows 81 to be secured easily and accurately in a definite direction against the body fitting 1. That is, by appropriately setting the protrusion 16 for positioning in connection with the state of attachment of the body fitting 1, the notch windows 81 can be positioned in the required direction such as the fore-and-aft and lateral direction of the vehicle.

For example, as for the vibration isolating device used while being inclined and attached in a lateral direction of the vehicle to the inclination of the bottom 1b of the body fitting 1, when the notch windows 81, 81 are faced toward the fore-and-aft direction of the vehicle, the notch windows 81, 81 of the stopper fitting 8 can be positioned and secured to the fore-and-aft direction of the vehicle, by providing the protrusion 16 for positioning in a position of the direction square to the inclined direction of the bottom 1b. When the notch windows 81, 81 are faced to the lateral and inclined direction of the vehicle, positioning can also be made easily by setting the position of the protrusion 16 to the direction as aforementioned.

Furthermore, in the state of use with the vibration isolating device attached to the vehicle, even when the stopper fitting 8 abuts against the member 20 such as brackets on the side of the vibration generator at the time of bounding and is loaded locally and repeatedly by this abutment as indicated by the numeral 25 in FIG. 4, since the protrusions 16 are fitted into and engaged with the two notch windows 81, 81, it is not apprehended that the stopper fitting 8 circumferentially gets out of position or parts from the body fitting 1, thereby capable of stably retaining the state of the stopper fitting 8 thus being secured.

Besides, proper and adequate draining and ventilating effects can be accomplished through at least two opposite notch windows 81, 81, to prevent the vibration isolating device 3 from changing inequality and deteriorating and also to increase its durability.

Industrial Applicability

A vibration isolating device of the present invention can easily and securely position and fix a stopper fitting, having at least two notch windows for drainage and ventilation, to opening extremities of a body fitting, and also restrain from getting out of position due to loading caused by a stopper action, thus capable of putting to use properly to support vibration generator such as vehicle engine for the purpose of vibration isolation.

What is claimed is:

1. A vibration isolating device comprising a body fitting having a cylindrical barrel, an upper side attachment fitting disposed in a spaced manner upward an axis center of the body fitting, a vibration isolating substrate made of a rubber material interposed between the body fitting and the upper side attachment fitting to connect both fittings, a stopper fitting fixed at opening extremities of the body fitting and extending upwardly outside the vibration isolating substrate, said stopper fitting having an end portion folded inside as a stopper portion, so that the stopper fitting acts as stopper function for large displacement of the upper side attachment fitting consequent upon vibration, and a notch window for drainage and ventilation being formed at least two opposite places at the lower portion of the stopper fitting;

a protrusion for circumferential positioning fitting-in and engaging with the notch windows provided at the opening extremities of the body fitting.

2. The vibration isolating device as set forth in claim 1, wherein the opening extremities of the body fitting are formed in the form of a flange, and the lower extremities of the stopper fitting being caulked and secured to the flanged opening extremities.

3. The vibration isolating device as set forth in claim 2, wherein the protrusions for positioning can be produced easily by projecting radially from the edges of the flanged opening extremities.

4. The vibration isolating device as set forth in any one of claims 1 to 3, wherein the protrusions for positioning are provided to engage with circumferential both side edges of the notch windows.

5. The vibration isolating device as set forth in claim 4, wherein the notch windows have opening width in a range of angle from 50 to 70° as viewed from an axial center of the device, and the protrusions are formed on at least both side extremities in a range corresponding to the notch windows.

6. The vibration isolating device as set forth in claim 4, wherein the upper side attachment fitting has a stopper flange projecting outwardly upwards the vibration isolating substrate, the stopper portion of the stopper fitting is interposed between the flange and the member on the vibration generator side fitted and secured above the flange so as to perform stopper action against vertical large displacement of the upper side attachment fitting.

7. The vibration isolating device as set forth in claim 6, wherein a diaphragm made of a rubber film is disposed opposite to the vibration isolating substrate at the lower side of the body fitting, there is a liquid-in chamber between the vibration isolating substrate and the diaphragm, the liquid-in chamber is divided into two liquid chambers on the side of the vibration isolating substrate and the diaphragm by means of a partition member, and both liquid chambers are connected by an orifice.

* * * * *